United States Patent
Vaidyanathan et al.

(10) Patent No.: US 9,396,329 B2
(45) Date of Patent: Jul. 19, 2016

(54) METHODS AND APPARATUS FOR A SAFE AND SECURE SOFTWARE UPDATE SOLUTION AGAINST ATTACKS FROM MALICIOUS OR UNAUTHORIZED PROGRAMS TO UPDATE PROTECTED SECONDARY STORAGE

(75) Inventors: Karthikeyan Vaidyanathan, Banglore (IN); Akshay R. Kadam, Banglore (IN); Royce Fernald, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 13/274,753

(22) Filed: Oct. 17, 2011

(65) Prior Publication Data

US 2013/0097655 A1 Apr. 18, 2013

(51) Int. Cl.
*G06F 17/00* (2006.01)
*G06F 21/55* (2013.01)
*G06F 21/57* (2013.01)

(52) U.S. Cl.
CPC ............... *G06F 21/55* (2013.01); *G06F 21/57* (2013.01)

(58) Field of Classification Search
CPC ............ G06F 21/78; G06F 2221/2141; G06F 2221/2149; G06F 12/1425; G06F 12/1441; G06F 12/1466; G06F 2009/45583; H04W 12/08
USPC ...................... 713/164, 167; 726/1, 24; 707/8; 711/103, 163; 709/219
See application file for complete search history.

(56) References Cited

U.S. PATENT DOCUMENTS

| | | | |
|---|---|---|---|
| 8,166,537 B1 * | 4/2012 | Viswanath et al. | 726/12 |
| 2008/0256073 A1 * | 10/2008 | Detlefs et al. | 707/8 |
| 2009/0282263 A1 * | 11/2009 | Khan et al. | 713/189 |
| 2009/0288167 A1 * | 11/2009 | Freericks et al. | 726/23 |
| 2011/0162077 A1 * | 6/2011 | Kadam | 726/26 |
| 2012/0159041 A1 * | 6/2012 | Saxena et al. | 711/103 |
| 2012/0272298 A1 * | 10/2012 | Jibbe et al. | 726/5 |
| 2013/0047264 A1 * | 2/2013 | Bjorkengren et al. | 726/27 |

OTHER PUBLICATIONS

Bayer, et al., "A View on Current Malware Behaviors," Usenix Workshop on Large-scale Exploits and Emergent Threats (LEET), USA, Apr. 2009; available at www.usenix.org/event/leet09/tech/full_papers/bayer/bayer.pdf, retrieved on Jan. 11, 2012.
Wikipedia, "Forensic disk controller," available at http://en.wikipedia.org/wiki/Forensic_disk_controller; retrieved on Jan. 11, 2012.

* cited by examiner

*Primary Examiner* — Brian Shaw
(74) *Attorney, Agent, or Firm* — Grossman, Tucker, Perreault & Pfleger, PLLC

(57) ABSTRACT

Described herein are articles, systems, and methods for using a storage controller to protect secure data blocks through the enforcement of a read only policy. In some embodiments, the articles use a combination of hardware protections and software protections (e.g., virtualization) to protect a system against attack from malware while such secure data is updated. Also described are systems and methods for securely updating data blocks secured in this fashion, and detecting and preventing the corruption of data stored on secondary storage media using a disk eventing mechanism.

13 Claims, 8 Drawing Sheets

METHODS AND APPARATUS FOR A SAFE AND SECURE SOFTWARE UPDATE SOLUTION AGAINST ATTACKS FROM MALICIOUS OR UNAUTHORIZED PROGRAMS TO UPDATE PROTECTED SECONDARY STORAGE

FIELD

The present disclosure generally relates generally to data storage protection and systems and methods for updating of protected data.

BACKGROUND

Malware is software that the owner/user of a computer system does not install himself. Frequently, malware is installed on a system without the user's knowledge. Left unchecked, malware can damage the system, e.g., by deleting or corrupting files. Moreover, malware may attempt to steal personal information about the user.

Typically, malware enters a computer system via the Internet, e.g., through a network interface device. However, it can also enter a system via an infected universal serial bus (USB) drive, via social engineering (i.e., phishing attacks), and various other mechanisms.

Upon entering a computer system, malware attempts to become "resident" by writing a copy of itself to persistent secondary storage, e.g., a hard disk drive. Once resident, the malware will remain on the computer system until it is found and deleted. However, becoming persistent does not guarantee that malware will be activated or loaded if the computer system is rebooted. To ensure boot time activation, malware may attempt to insert itself into the startup or boot sequence of the computer system. If this is successfully accomplished, the malware will reactivate every time the computer is switched on, and can survive reboots and/or power cycles.

One way that malware can "hook" into the boot sequence of a computer system is to modify or attach itself to important operating system (OS) executable files that are always loaded and activated during the OS boot process. Alternatively, malware can modify system configuration files that control boot processes by listing itself as a legitimate system file that is to be loaded at boot time. In either case, malware modifies or touches system files that typically should not be changed. Preventing malware from being able to modify critical system files would in effect prevent malware from being able to modify and insert itself into the system boot process.

DETAILED DESCRIPTION

In an attempt to protect persistent secondary storage against attacks from malicious or unauthorized programs, computer systems employing storage controllers have been proposed. Generally, such storage controllers operate to enforce a strict read-only policy for a range of secure memory addresses (i.e., secure disk blocks), such that no write operations issued by applications executed on the host computer system can overwrite such disk blocks. To this end, such storage controllers include functionality that exposes commands via the advanced host controller interface (AHCI) storage interface. These commands can enable software or firmware executed by the host CPU to mark specific disk blocks as read only. In this context, such an operation is known as locking a disk extent. A locked disk extent cannot be written to by any software running on the host CPU (e.g., user or kernel space programs).

A storage controller can enforce a read-only policy by intercepting write operations issued by software executed on the host computer system and comparing the object of those write operation to a list of secure disk blocks maintained in memory. If a write operation would overwrite or modify a secure disk block, the storage controller prevents completion of that write operation by aborting the operation.

Figure 1:
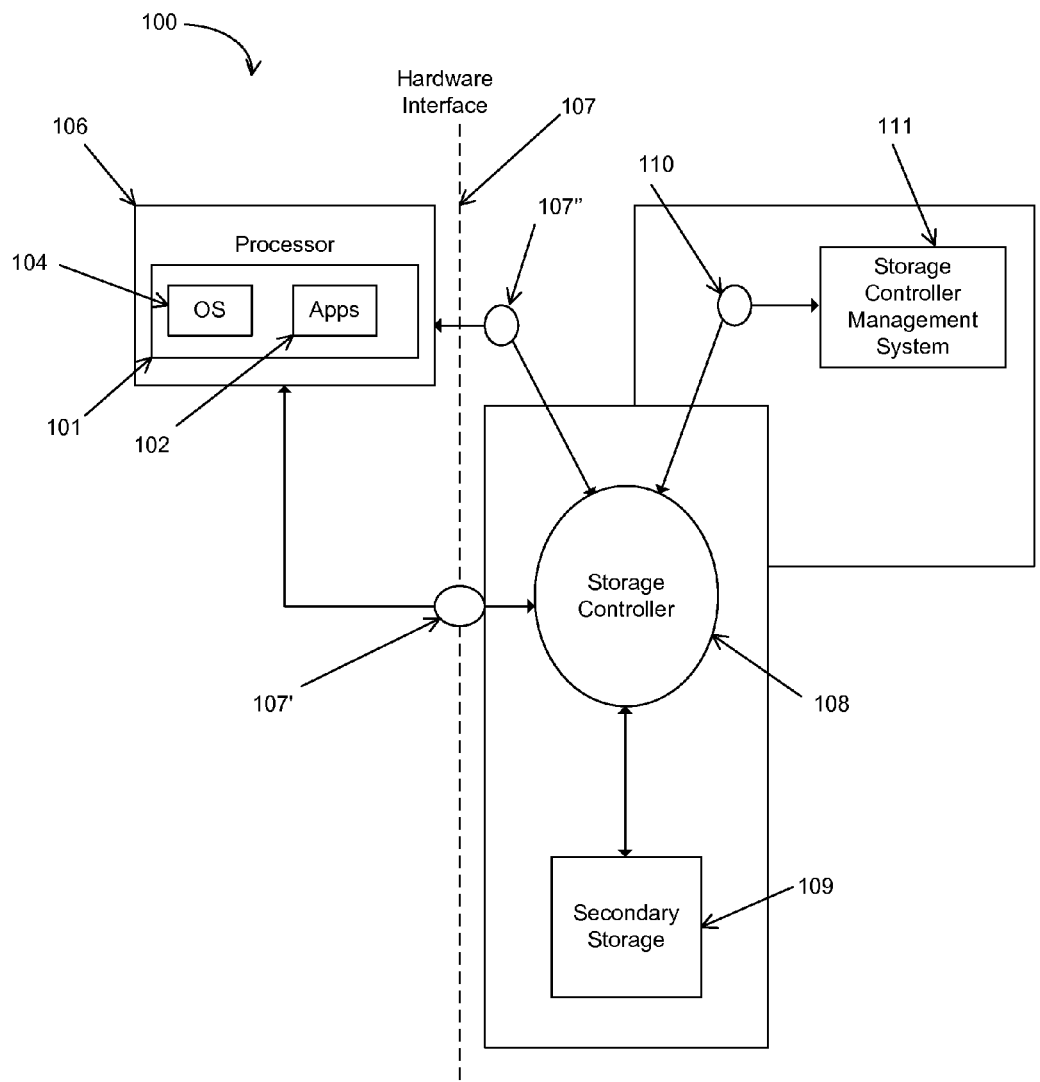
FIG. 1 is a block diagram of a system employing a storage controller.

One non-limiting example of a system employing a storage controller consistent with the above is shown in FIG. 1. As shown, system 100 includes processor 106 running software 101, e.g., operating system 104 and applications 102. Software 101 uses a hardware interface 107, e.g., I/O interface 107' to communicate with storage controller 108. Storage controller software or firmware (not shown) executed by processor 106 uses a secure hardware interface (e.g., locking interface 107") to communicate locking commands to storage controller 108. Storage controller 108 interfaces (e.g., via a memory controller hub) with secondary storage 109, and enforces a read-only policy for secure data blocks on secondary storage 109 that are identified by locking commands sent by software or firmware executed by processor 106, and/or which are identified in a list of secure data files/blocks stored in memory.

As shown in FIG. 1, storage controller 108 also interfaces with storage controller management system 111 via secure interface 110. As a non-limiting example of an interface that may be used as secure interface 110, mention is made of the Intel® vPro® technology provided by Intel Corporation. This enables storage controller management system 111, which is external to system 100, to securely configure and manage system 100 as an enterprise resource via secure interface 110. In an enterprise setting, storage controller management system 111 allows users (e.g., network administrators) to manually lock and unlock secure data blocks protected by storage controller 108 by sending locking and unlocking signals to storage controller 108 via secure interface 110.

Hardware controllers such as, for example, the storage controllers previously described make it possible to enforce a read only policy in hardware on secure data blocks corresponding to important files, including those of the operating system (e.g., drivers, configuration files, etc.). In that way, such systems can prevent malware from modifying such secure data blocks and becoming permanently resident on a system. However, software that installs, upgrades, and/or repairs existing software or firmware (hereafter, "patches," "patch utilities," "patching utility" or "patching utilities") may legitimately need to modify files secured by the storage controller. Since the secure disk blocks corresponding to these files are locked down by the storage controller, patch utilities may be unable to perform such operations. While manual unlocking of secure data blocks can be accomplished with a client management system external to the protected system (e.g., the storage controller management system described above), such a system is cumbersome and does not permit patch utilities to modify secure disk blocks that are protected by a storage controller in a natural and convenient manner.

The systems and methods of the present disclosure address the need to legitimately modify secure data files/blocks protected by a storage controller that enforces a read only policy on secure data blocks. As described in detail below, the systems and methods described herein can quarantine modifications made by patch utilities to a quarantine region of a secondary storage medium as "proposed changes" to secure data blocks protected by such a storage controller. Then, a verification and update process can be employed to validate the proposed changes and, if validation succeeds, to update the files/blocks protected by the storage controller. In this way, the systems and methods of the present disclosure can provide a safe and secure way of updating data secured by a storage controller without interference from malware.

As used herein, the terms, "disk," "hard disk," "secondary storage," "secondary storage medium," "storage medium," "persistent storage," and "memory" include, but are not limited to conventional rotating magnetic media (i.e., hard disk drives), thermally assisted magnetic recording media, non-volatile memory such as, for example, flash-based solid-state disks (SSDs), phase change memory ("PCM"), phase change memory and switch ("PCMS"), nanowire memory, NAND memory, NOR memory, non-volatile RAM (NVRAM), a combination thereof, or any other type of block-based device used to store data persistently. In some non-limiting embodiments, the present disclosure utilizes a solid state disk ("SSD") as secondary storage.

As used herein the term "storage controller" means any of a variety of hardware mechanisms for enforcing a read only policy on data blocks stored on a secondary storage medium. Non-limiting examples of such storage controllers include the storage controllers described in U.S. patent application Ser. No. 12/655,466, which is assigned to Intel Corporation. Such a storage controller may include one or more secure interfaces, such as, for example, the Intel® vPro® technology provided by Intel Corporation.

For the purpose of the present disclosure, the terms "secure data block," "secure data blocks," and "secure data" are used interchangeably to mean physical disk capacity (in blocks) of a secondary storage medium that are protected by a storage controller, such as, for example, the storage controllers described herein. Blocks are protected by a storage controller if the storage controller enforces a read only policy on them. I.e., the storage controller prevents the completion of write operations directed at such blocks.

A file system is a core component of most general-purpose operating systems, and is responsible for managing all persistent secondary storage on a platform. Applications read and write "files" using services provided by the file system. As used herein, the term "file" refers to collection of data stored in one or more data blocks. As such, "secure data file" means a collection of data stored in one or more secure data blocks.

The file system allows applications to read and write data to secondary storage at the granularity of a single byte. However, secondary storage drives such as, for example, hard disk drives often operate at the granularity of "blocks," which are typically 512 bytes in size. As a result, file systems often implement read-modify-write operations to provide a more convenient byte-granular access for applications to use. This implies that every file stored on the disk is mapped to a set of one or more whole disk blocks.

Thus, for the purpose of the present disclosure, the terms "secure data file," and "secure data files" are used to refer to one or more files that are associated with one or more secure data blocks. Because of this association, such files are "secure," and are protected by a storage controller. Moreover, and as discussed in further detail below, registry entries are also mapped to data blocks of a secondary storage medium, and may be protected by a storage controller. It should therefore be understood that all operations discussed herein with respect to secure data blocks may also be performed on secure data files and secure registry entries, and vice versa.

As introduced above, the file system is responsible for managing the mapping of files to blocks. This mapping (and associated information) is stored by the file-system on the disk and is referred to as "file system metadata" or the master file table (MFT). The MFT is used by the file system to translate file level input output (I/O) requests (e.g., read/write/modify requests) to disk level I/O requests (e.g., read/write/modify requests).

A registry is another core component of many operating systems such as, for example, Microsoft WINDOWS®. The registry may, for example, store and manage system and software configuration information, user account information and other information such as, for example, one or more performance counters. The registry may also control the startup sequence for system services and device drivers. Registry information may be loaded before the file system, e.g., early in the boot sequence (as is the case in Microsoft WINDOWS®). Since the registry controls vital aspects of system operation, particularly the OS startup sequence, malware often attacks registry configuration information in an attempt to ensure that it is loaded by the OS during the boot sequence. Like file access, the registry is accessed at a byte-granular level via a dedicated set of registry access application program interfaces (APIs).

Registry information may be maintained in system files, for example "registry hives." Unlike file data however, subcomponents of the registry such as keys, corresponding data and their values may occupy only a portion of a disk block. That is, such subcomponents do not need to be block-aligned. In some embodiments of the present disclosure, the systems and methods described herein help protect byte level structures such as, for example, registry information using block-oriented protection mechanisms provided by a storage controller.

Figure 2:
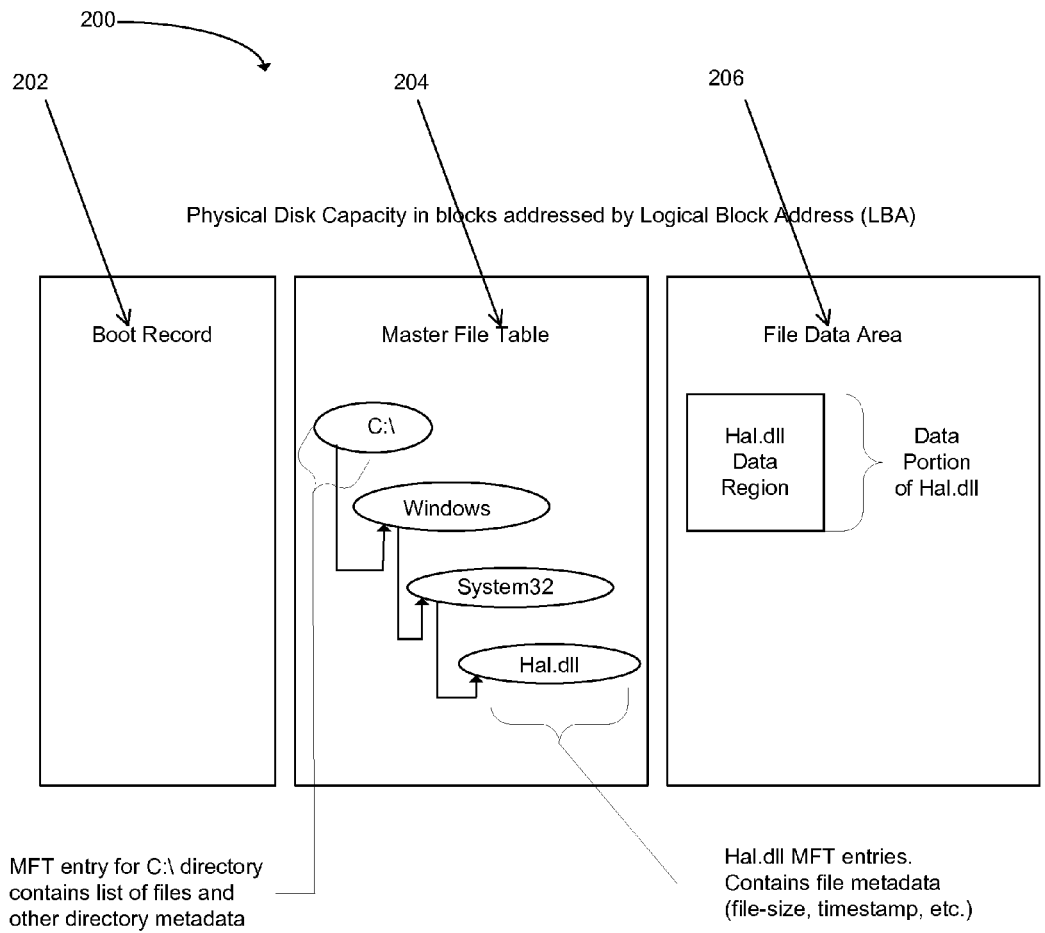
FIG. 2 is a block diagram showing a non-limiting example of a locking operation according to the present disclosure.

Broadly, a typical disk layout contains three regions. One region includes blocks corresponding to the boot sector that is used to load (boot) an OS into the memory of a system. Another region includes a set of blocks corresponding to data that describes other data (hereafter, "metadata"). For example, a disk may include a set of blocks corresponding to file system metadata. And another region includes a set of blocks where the data portion of a file is stored. This concept is illustrated in FIG. 2, which is a block diagram of an exemplary locking operation in a file system that is typical for a Windows NT file system. As shown, file system 200 includes a boot record 202, a master file table (MFT) 204, and a file data area 206. The master file table 204 includes the entry for the default drive designation e.g. the C:\ directory, which contains a list of files, directories, and metadata (file-size, timestamp, etc.). File data area 206 includes the data portion of the files identified in the master file table 204.

Thus, locking and enforcing a read only policy on a file system such as, for example, the one shown in FIG. 2 with a storage controller (e.g., storage controller 108 in FIG. 1) may require locking several different file system components. For example, the data portion of the file (i.e., the disk regions of file data area 206) may be locked by a storage controller so as to ensure that in-memory changes made to the file data do not persist in the disk. However, because directories maintain a portion of a file's metadata, it may be possible for malware to change the directory entries and bypass the file data protection. Hence, it may also be desirable to lock the metadata stored in MFT 204. Accordingly, in the non-limiting example shown in FIG. 2 (where a hal.dll file is stored in the C:\Windows\system 32 directory), locking the hal.dll file with HIS hardware would involve locking down the data portion of hal.dll stored in the file data area 206, as well as locking down the metadata entries of hal.dll, c:\windows\system32, c:\windows, and c:\ in the master file table 204.

The phrases "lock down" and "lock down operation" are interchangeably used herein to refer to the enforcement of a read only policy on all or a portion of file system components correlating to a file (data blocks) that is (are) to be protected by a storage controller. In some instances, a storage controller is configured to lock down all file system components correlating to secure data blocks (e.g., files) that are to be protected by the storage controller.

As noted above, enforcing a read only policy on protected disk regions (e.g., as shown in FIG. 2) may disrupt the operation of legitimate software applications and patching utilities, since valid writes to these protected disk regions will be denied by the storage controller and thus fail. This may cause legitimate patching utilities to behave unpredictably. In addition, the operating system may consider the secure data blocks protected by a read only policy enforced by a storage controller as "bad sectors" during failed write operations, and attempt to move them to other parts of the disk.

To address this issue, one aspect of the present disclosure relates to storage systems and methods in which a secondary storage medium is divided into three physical regions, namely: (i) a protected region in disk in which secure data blocks are protected by read-only protections enforced by a storage controller, preventing modification of such secure data blocks by any host-based software entity; (ii) a writable region which is used to store normal writable data; and (iii) a quarantined, unprotected region for maintaining changes made by patch utilities to secure data blocks (e.g., files and/or directories) protected by a storage controller.

Figure 3:
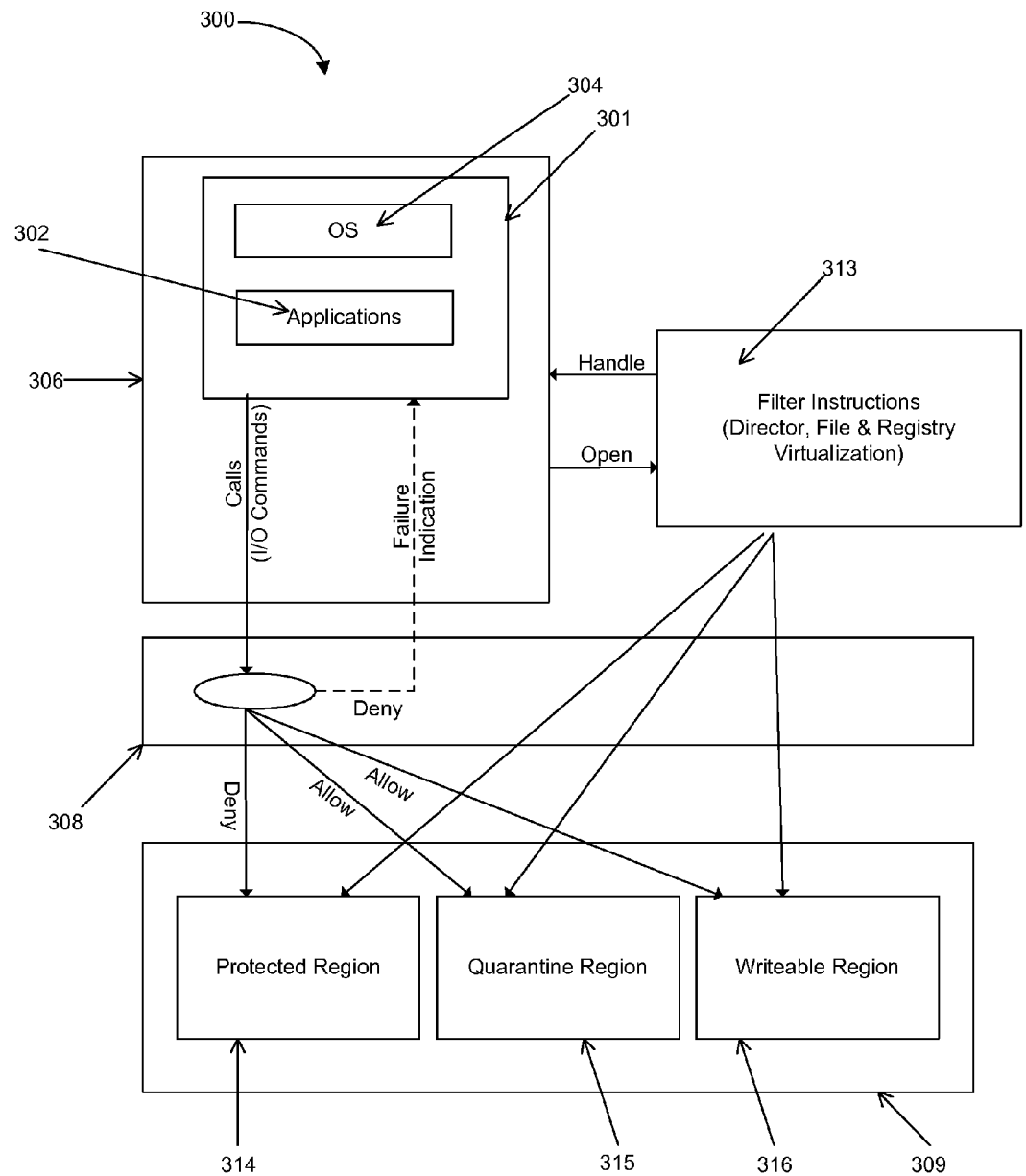
FIG. 3 is a block diagram showing the operation of selected components of an exemplary system employing a storage controller accordance with the present disclosure.

FIG. 3 shows a system 300 configured in accordance with one non-limiting embodiment of the present disclosure. System 300 includes processor 306 running software 301, such as, for example, applications 302 and operating system 304. Software 301 uses a hardware interface (e.g., a bus) to communicate with hardware, such as storage controller 308. System 300 further includes secondary storage 309, which is divided into protected region 314, quarantine region 315, and writable region 316. Finally, processor 306 executes instructions 313 (hereafter, "filter instructions 313"), which may be stored in a system memory (e.g., random access memory (RAM) or read only memory (ROM)) coupled to said processor. Filter instructions 313 may also be stored in a memory that is local to processor 306, or to a component of storage controller 308. For example, filter instructions may be stored within local memory coupled to a microcontroller of a platform controller hub (PCH) within storage controller 308. Alternatively or additionally, filter instructions may be stored within a main memory (RAM) of a memory controller hub (MCH) within storage controller 308.

Regardless of where filter instructions 313 is/are stored, it may be desirable to "lock down" the data blocks corresponding to filter instructions 313 with storage controller 308, so that malware cannot infect filter instructions 313. Locking down the data blocks corresponding to the filter instructions 313 may be particularly desirable when filter instructions 313 are stored in a memory or other tangible storage medium separate from processor 306, as the filter instructions 313 may be more susceptible to attack by malware when stored in such a location.

Storage controller 308 may include a variety of components, such as, for example, the PCH and MCH noted above, an integrated serial advanced technology attachment (SATA) controller, memory, one or more secure interfaces, etc. (all not shown). Such components may be leveraged to enforce a read only policy on secure data blocks that are protected by the storage controller. Generally, storage controller 308 intercepts I/O requests (e.g., read/write/modify requests) issued by software 301 (illustrated in FIG. 3 as I/O commands), and denies I/O requests to write or modify secure data blocks protected by a read only policy enforced by storage controller 308. Secure data blocks protected by storage controller 308 are maintained in protected region 314 of secondary storage 309. Unsecured data blocks are maintained in writable region 316 of secondary storage 309.

As noted above, updating secured data blocks protected by a storage controller may be difficult, because the storage controller will deny even legitimate I/O requests to modify or write to such blocks. In the non-limiting example shown in FIG. 3, filter instructions 313 addresses this issue by intercepting all I/O requests by software 301 running on processor 306 to access secure data blocks maintained in protected region 314, and transparently redirecting changes to those secure data blocks to quarantined region 315 via a virtualization process.

Virtualization provides an environment in which one or more logical resources can be allocated within one physical resource. File system virtualization and directory virtualization provide the capability to maintain different versions of specific folders and files on the same physical resource. Thus, file system virtualization may be achieved, for example, by transparently redirecting changes made to secure data blocks (e.g., secure files) to a different location on the same secondary storage medium.

Though different versions of a particular file may be physically stored at different locations (e.g., different folders), the operating system can view the complete set of files and/or folders as though they were in a single location (e.g., in a single folder). In this way, the maintenance of multiple file versions on the same physical resource is "transparent" to the operating system. Directory virtualization may be accomplished in much the same manner as file system virtualization, i.e., by transparently redirecting changes to directories to a different location on the same secondary storage medium.

Figure 4:
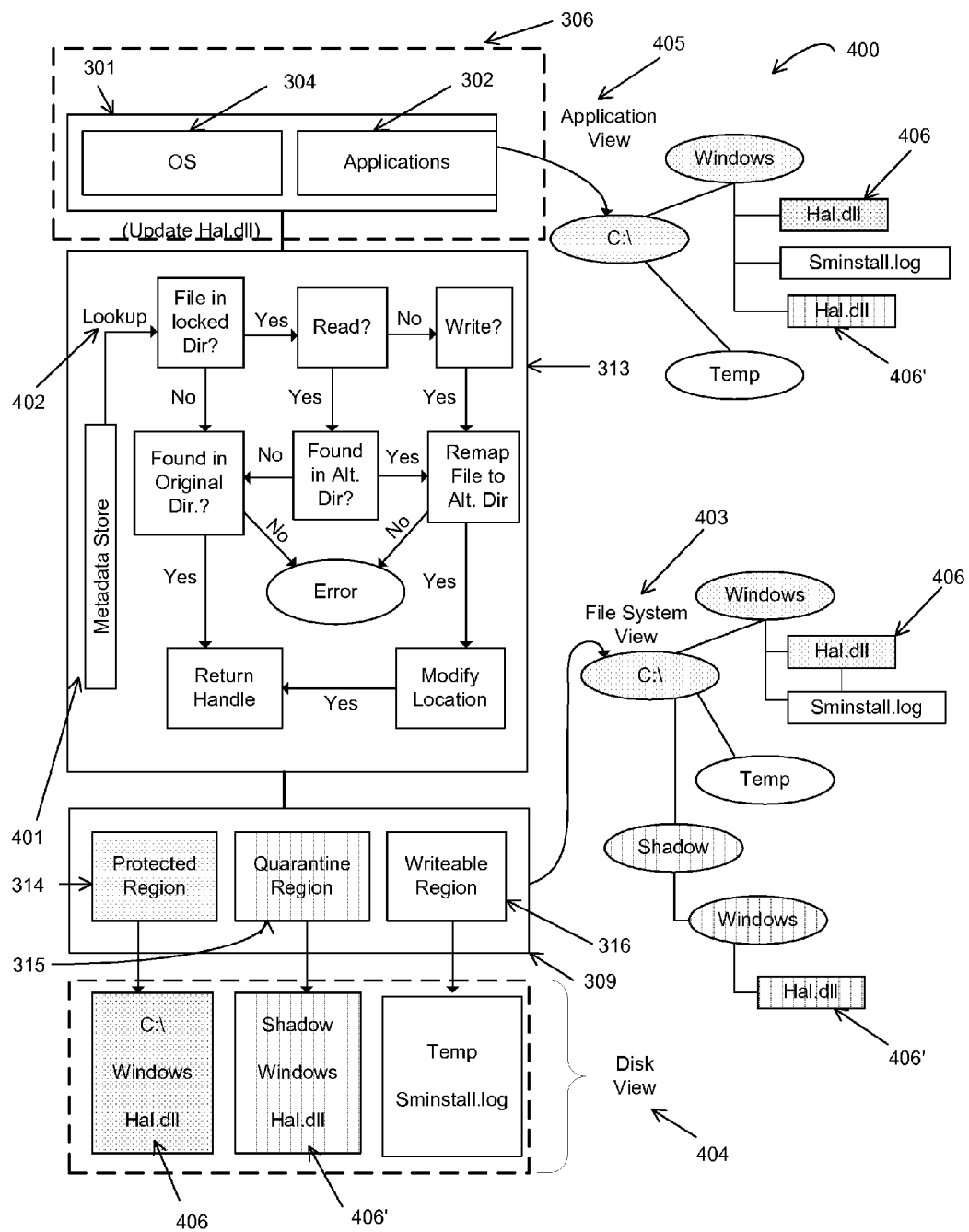
FIG. 4 is a block diagram showing the operation of a filter instructions performing file system virtualization according to a non-limiting embodiment of the present disclosure.

FIG. 4 depicts a non-limiting example of the operation of filter instructions 313 in accordance with present disclosure, as they perform file system and directory virtualization when executed by a processor 306 in a system 400. As shown, filter instructions 313 maintain in memory a list (e.g., metadata store 401) of all secured data blocks that are stored in protected region 314 of secondary storage medium 309. In operation, filter instructions 313 intercept all I/O requests targeting files and folders (data blocks) maintained on secondary storage medium 309. In lookup operation 402, the filter instructions 313 compare the object of each intercepted I/O request to the list of secured blocks maintained in metadata store 401. If the object of an I/O request is not a secured data block, filter instructions 313 allow the I/O request to take its default action. If the object of an I/O request is a secured data block, the filter instructions 313 can take a variety of actions, depending on the nature of the I/O request and the information stored in the secondary storage medium 309.

If the I/O request is directed to a secure data block and is a write or modify request, the filter instructions 313 can cause a corresponding copy of the requested secure data block to be written to quarantine region 315 of secondary storage medium 309, if a corresponding copy of such secure data block is not already present. If a copy of the secure data block is already present on quarantine region 315, that corresponding copy can be used. Filter instructions 313 can then redirect the I/O request to the corresponding copy, and the changes proposed by the I/O request can be written to the corresponding copy. The original secure data block is left unmodified, and remains protected by a storage controller within protected region 314 of secondary storage medium 309.

If the I/O request is directed to a secure data block, and is a read only request, filter instructions 313 may or may not redirect the I/O request to quarantine region 315. The decision to redirect or not can be based on the presence or absence of a corresponding copy of the requested secure data block in quarantine region 315. If a corresponding copy of the secure data block is found in quarantine region 315, the I/O request can be directed to that corresponding copy. In some instances this can be advantageous, because the corresponding copy may be more recent than the original secure data block stored in protected region 314. If a corresponding copy of the secure data block is not found in quarantine region 315, the I/O request can be directed to the original copy of the secure data block stored in protected region 314.

In the non-limiting example shown in FIG. 4, protected region 314 of the secondary storage medium 309 holds c:\, c:\windows, and c:\windows\hal.dll (hereafter, hal 406) entries. Writeable region 316 holds other files such as, for example, c:\windows\sminstall.log and the files located in c:\temp. During execution, if a patch utility issues an I/O request to update (write/modify) hal 406, filter instructions 313 redirect the I/O request to a corresponding copy of the hal 406 file (hereafter, hal 406'), which is created or maintained in quarantine region 315, in this case c:\shadow\windows\. The write/modify request issued by the patch utility is then executed only on hal 406'. In the non-limiting example in FIG. 4, this results in file system and directory virtualization wherein different versions of the hal.dll (i.e., hal 406 and hal 406') file are stored in different folders at physically separate locations within secondary storage medium 309, as illustrated by file system view 403 and disk view 404. However, the file system and directory virtualization performed by filter instructions 313 also provides an application view 405, which allows software 301 running on processor 305 to view hal 406' in quarantine region 315 as being part of C:\windows, as illustrated in FIG. 4. Thus, the redirection of the I/O request to modify hal 406 to hal 406' is "transparent" to the operating system.

It is noted that the file system virtualization and directory virtualization processes discussed above may be executed by the filter instructions described herein during the control path (open I/O request or directory query, etc.) operation of a system. As such, the file system virtualization and directory virtualization may not impact the data path operation (reading and writing) of a system.

Alternatively or additionally, the filter instructions of the present disclosure may be configured to perform registry virtualization. Similar to file system and directory virtualization, registry virtualization allows changes to secure data blocks corresponding to protected registry entries to be performed transparently. Unlike files, however, registry entries changes may be byte granular, rather than block granular. That is, one disk block may contain several registry entries, including entries for which protection by a storage controller is desired, and entries for which protection by a storage controller is not necessary. Due to this difference in granularity, the file and directory virtualization discussed above may not by itself allow only secure data blocks corresponding to protected registry entries to be updated. Rather, an entire disk block (including protected and unprotected entries) may be updated if only file and directory virtualization is used.

To address this issue, some embodiments of the systems and methods of the present disclosure partition the registry into multiple components. For example, the registry may be partitioned into a first component for maintaining protected registry entries, and a second component for maintaining unprotected registry entries. The protected registry entries (first component) may be stored as secure data blocks in the protected region of a secondary storage medium, and may be protected by a storage controller. The unprotected registry entries (second component) may be stored as unsecured data blocks on an unprotected region of a secondary storage medium, e.g., a quarantine region or a writeable region. In some non-limiting embodiments, the first component contains protected registry keys and their associated content, and the second component is a "shadow" of the first component, meaning that it contains the same protected registry keys (as well as unprotected keys), but does not contain the content associated with the protected registry keys. In other words, the protected registry keys in the "shadow" registry may be "empty."

The filter instructions of the present disclosure can in some embodiments handle all registry operations on the secure registry entries, similar to the manner in which the filter instructions can handle I/O requests directed to secure data blocks corresponding to protected files, as described previously. In this regard, reference is made to FIG. 5, which depicts a non-limiting example of the operation of filter instructions 313 as they perform registry virtualization when executed by a processor 306 in a system 400 in accordance with a non-limiting embodiment of present disclosure. As shown, filter instructions 313 maintain a list of all secured data blocks (e.g., in a metadata store 401) corresponding to secure registry entries (e.g., the first partition), and which are stored in protected region 314 of secondary storage medium 309.

In operation, filter instructions 313 can intercept all registry operations, including those requested by software 301 running on processor 306. In lookup operation 402, the filter instructions 313 can compare the object of each intercepted registry operation to the list of secured blocks maintained in metadata store 401. If the object of registry operation is not a secured data block (i.e., is not drawn to a secure registry entry), filter instructions 313 may allow the registry operation to take its default action. If the registry operation is directed to a secure registry entry, filter instructions 313 can redirect the registry operation to a duplicate, writable copy of the registry (e.g., a "shadow" registry) that is maintained in quarantine region 315 of secondary storage medium 309. The registry operation is then performed on the duplicate, writeable copy of the registry. The secure registry entries stored in protected region 314 are left unmodified, and remain protected by a storage controller.

Figure 5:
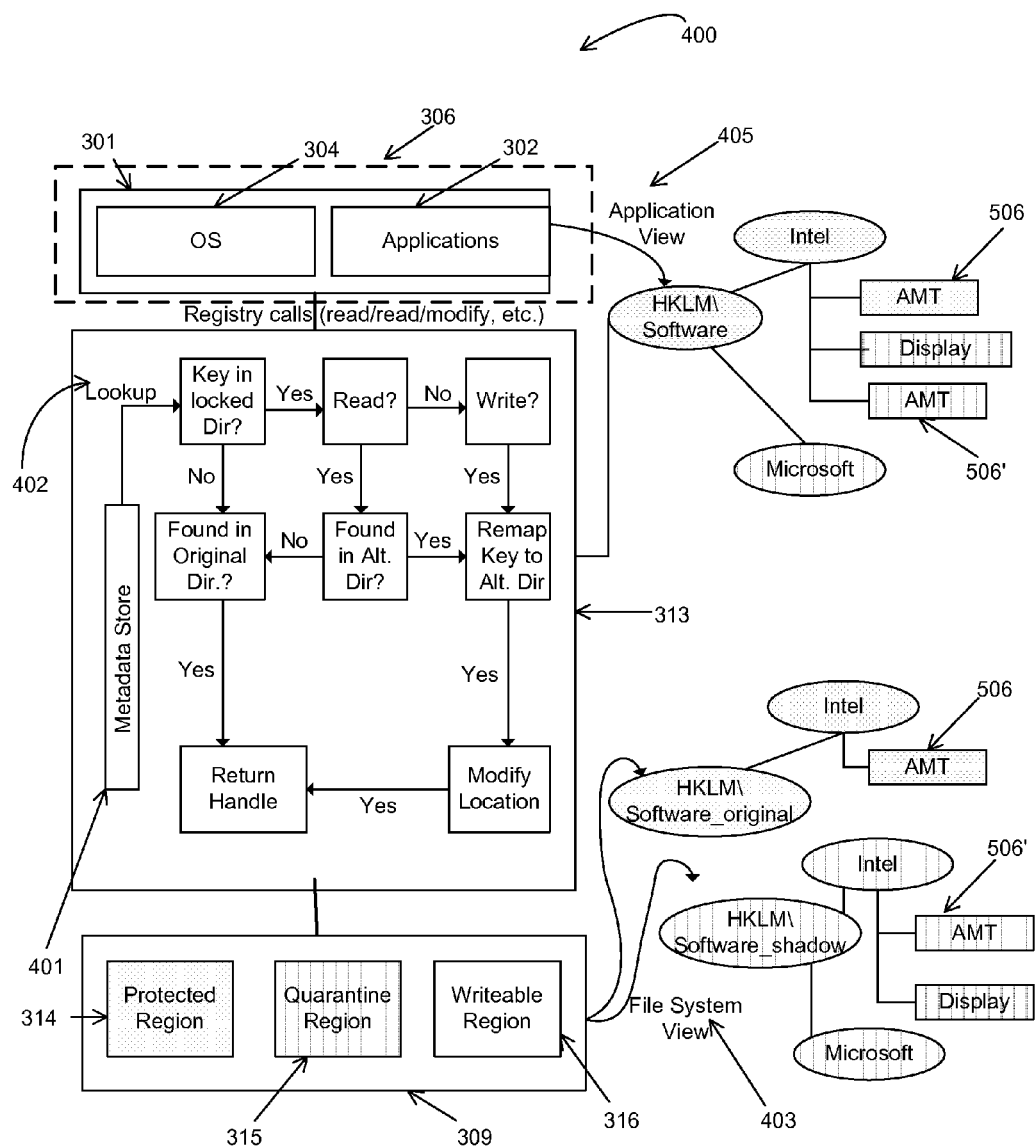
FIG. 5 is a block diagram showing the operation of a filter instructions performing registry virtualization according to a non-limiting embodiment of the present disclosure.

In the non-limiting example shown in FIG. 5, the protected region 314 of secondary storage medium contains the protected Intel key and AMT key 506 under a protected HKLM\software_original key, as well as their associated content. Identical keys, but without the associated content, are maintained in a "shadow" registry stored on quarantine region 315 under HKLM\Software_shadow. The "shadow" registry also includes other unprotected registry keys such as, for example, display, and Microsoft.

During execution, if a patch utility issues a registry operation to update the protected AMT key 506, filter instructions 313 can redirect the registry operation to a "shadow" copy of AMT key 506 (i.e., AMT key 506') in a "shadow" registry stored in quarantine region 315. The registry operation issued by the patch utility is then executed only on AMT key 506'. This results in registry virtualization, wherein different versions of the AMT key (i.e., AMT key 506 and AMT key 506') are stored in different folders at physically separate locations within secondary storage medium 309. However, the registry virtualization performed by filter instructions 313 can also provide an application view 405, which allows software 301 running on processor 305 to view AMT key 506 and AMT 506' as entries as being part of HKLM\software.

Using a combination of the storage controller and virtualization processes described above, the systems and methods of the present disclosure can robustly enforce a read-only policy for a specified set of secure data blocks/files/registry entries. Protecting all important operating system executable and configuration files with such systems and methods can prevent malware from becoming persistent on a system. However, as explained previously, patch utilities may need to legitimately modify these protected files. Since the storage controllers described herein prevent modification of secure data files by any host based software, patch utilities may be unable to update such secure data files.

Because of the potential for malware to enter and subvert a system during application of a software update, it is important to verify and validate changes to protected disk regions (e.g., secure data blocks/files) before such changes are permanently committed. Using the combination of a storage controller and virtualization described above, the systems and methods of the present disclosure provide the opportunity to perform such a validation process.

Accordingly, another aspect of the present disclosure relates to systems and methods that employ a validation and update process during system boot to validate proposed changes to secure data files/blocks protected by a storage controller. If such validation succeeds, the systems and methods described herein may commit the changes to such secure data files/blocks.

In this regard, some embodiments of the present disclosure employ an operating system that is configured to load binary images (device drivers, startup services, etc.) and configuration information from the protected region of a secondary storage medium. That is, operating systems used in accordance with the present disclosure may be configured such that they initially load secure data files and secure registry entries that are protected by a storage controller. As explained above, even if those secure files and registry entries are the target of an update process (e.g., by a malware program or a legitimate patching utility), the filter instructions of the present disclosure can redirect the update process to a copy of the target file(s) stored in a quarantined region of a secondary storage medium. As a result, the changes from a malware/patch program may not be committed to the original secure data at the time the malware/patch is executed. Rather, such changes are applied to the quarantined corresponding copies of the target secure data files.

In some embodiments, the operating systems described herein may be configured to load secure system files from a protected region of a secondary storage medium during boot. In such instance, the boot process can be used as a safe and secure environment to validate proposed changes to secure system files and, if validation succeeds, to update such secure data files in a malware-free environment. This is particularly true if all binary images (driver files, configuration information, etc.) that are loaded during boot ("boot time components) are "locked down" by a storage controller and the virtualization processes described above.

In this regard, some embodiments of the present disclosure employ a verification agent (hereafter, a "patch verification agent") during a boot sequence to validate the authenticity and/or content of changes proposed by a patch utility to secure data stored in a protected region of a secondary storage medium. The patch verification agent may be stored, for example, in a tangible memory of a processor used in the systems described herein, or in another memory coupled to such a processor. For example, and with reference to FIG. 3, the patch verification agent may be stored as firmware in the same memory of processor 306 as filter instructions 313, or in a different memory. In any case, the patch verification agent may be stored in a manner that inaccessible to software running on the host system, so as to protect the patch verification agent itself from attack by malware.

As noted above, the patch verification agent may be executed by a processor during the boot sequence of a host system. While the patch verification agent can be executed at any time during a boot sequence, it is preferably executed after a boot loader, startup drivers, and associated registry keys are identified and protected by a storage controller. This ensures that during each boot operation, the operating system will load only content that stored in a protected region of a secondary storage medium and which is protected by a storage controller. Such secure content may be loaded in an initial part of the boot sequence, hereafter referred to as the "protected boot sequence." If the patching agent is introduced as a part of the protected boot sequence, it may be guaranteed to run in a malware-free environment during every boot operation. Moreover if all boot-time components are locked down by a storage controller and the virtualization processes described above, they can be assumed to be malware free when loaded during each boot operation.

To validate proposed changes to secure data files, the patch verification agent can execute a validation operation on software updates and installations that were performed in a previous session, and which are maintained in a quarantine region of a secondary storage medium. To this end, the patch verification agent may take advantage of one or more identifying characteristics embedded or encoded in the updates and software installations under consideration. For example, many software installation and update formats have mechanisms to securely verify the author of the software, and the validity of the software contents. Such mechanisms include, but are not limited to digital signatures and secure hash algorithm 1 (SHA-1) hashes. The patch verification agents according to the present disclosure may be configured to extract such information and accordingly verify and validate at least one of file, directory, and registry changes in a quarantined region of a secondary storage medium. If the validation operation succeeds, the patch verification agent can commit the patch/software update by causing the processor to swap the corresponding copy of the secure data files/block stored in the quarantine region with the secure data files/blocks stored in the protected region. In this way, secure data files protected by a storage controller can be modified and/or replaced in a safe and secure manner.

Figure 6:
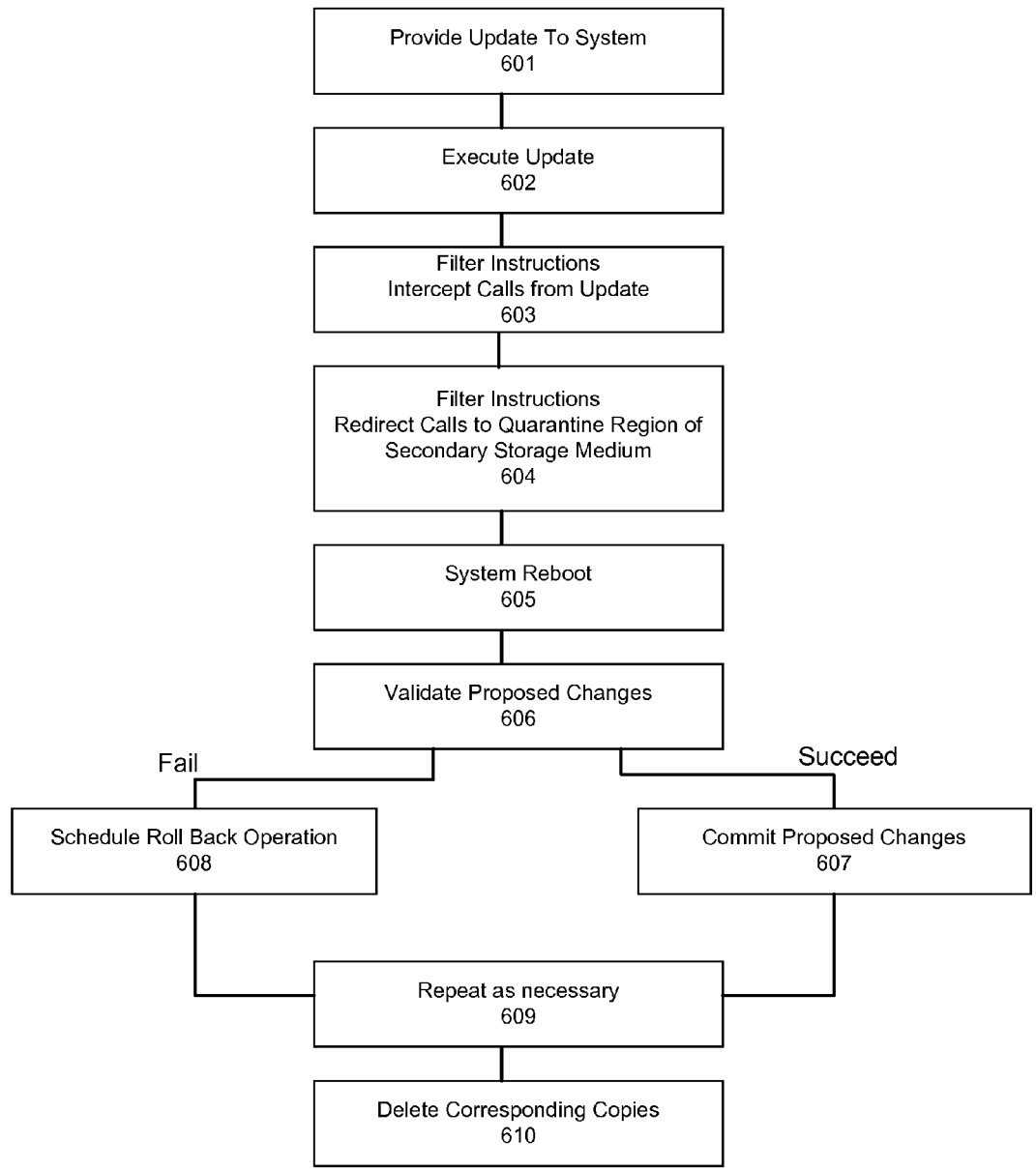
FIG. 6 is a flowchart of a non-limiting method of updating software in accordance with the present disclosure.

FIG. 6 is a flow chart of a non-limiting method for patching or updating secure data files/registry entries (i.e., secure data blocks) that are protected by a storage controller. In step 601, a software update (e.g., an executable patch utility) is provided to the host system in question. This may be accomplished, for example, by downloading the patch utility to the host system from the Internet, or providing patch utility from a storage medium such as, for example, a compact disc, digital virtual disc, a USB drive, etc. The patch utility may also be "pushed" to the host system by another system over a network.

In execute update step 602, the patch utility is applied, e.g., by running an executable file. During application of the patch utility, the filter instructions of the present disclosure can intercept all I/O requests (step 603) generated by the patch utility, and redirect I/O requests to secure data files and secure registry entries (secure data blocks) to a quarantined, unprotected region of a secondary storage medium, as described above (step 604). This approach can provide several benefits. For example, if a patch utility does not require a reboot, software running on a processor of the host system will instantly see the effect of the patch utility, since the software running on the processor will retrieve the latest version of the files or information on the storage medium, which are present in the quarantined region. In addition, since only the copies of the secure data files and secure registry entries are modified, this approach provides the opportunity to validate the results of the patch utility at a later point in time, before they are committed to the original secure data files and registry entries stored in a protected region of a secondary storage medium.

When the system is rebooted (step 605), changes to the secure data files and secure registry entries can be verified and validated. This validation process may be accomplished by a patch verification agent in validation step 606, in the manner previously described. As shown in FIG. 6, if the validation operation performed by the patch verification agent fails with respect to a particular update, the patch verification agent schedules a roll-back operation (step 608), and the update is not committed to the protected region. If the validation operation succeeds, the patch verification agent can commit the update in step 607 by causing the processor to swap files from the quarantined region to the protected region, thereby updating the relevant secure data files.

The patch verification agent may perform a validation operation on all updates and/or software installations performed in a previous session, as shown by step 609 in FIG. 6. Upon completion of all such validation operations, the patch verification agent may be configured to cause the processor to delete corresponding copies of secure data files and secure registry entries in the quarantine region, shown in FIG. 6 as step 610.

As noted above, malware (e.g., computer viruses, trojans, worms, etc.) can infect files and data stored on the hard disk of a host computer system. Once the files/data are infected, the malware may become persistent on the host system, and can be activated every time the host system is restarted. To remove malware from the computer, the infected file can be replaced or otherwise "cleaned." Many anti-virus solutions (AVS) detect the presence of malware using a fingerprint or signature that is unique to the specific malware version, after the malware has infected the system. Due to the remediation measures required to cleanse infected files in a host system, it would be advantageous to detect and address malware before it can infect files stored on the hard drive of a host system.

Accordingly, another aspect of the present disclosure relates to systems and methods that allow software running on a host system to detect the possible infection of a file on host system secondary storage (e.g., hard drive) before the infection has taken place, i.e., before malicious data is written to such secondary storage. Generally, such systems and methods function by monitoring write requests to sensitive disk regions and reporting such write requests to antivirus agent software (AVS) residing on a host computer system. This provides an opportunity for the AVS to analyze the write request for potential infection by malware, prior to committing the write request to disk.

In some embodiments, the systems according to the present disclosure employ a disk eventing class/port filter instructions (DEFI), an AVS agent (AVA), and disk eventing firmware to monitor, report, and evaluate write requests to sensitive disk areas. Each of these components is described in detail below.

The DEFI is software or firmware that is capable of being executed on a processor, such as, for example, the processor of a host system. In some cases, the DEFI is executed within the context of the storage stack of an operating system. The DEFI is capable of intercepting and analyzing all requests and responses between applications, the file-system, and secondary storage. As described in detail below, the DEFI can be used to redirect disk events generated by disk firmware to the AVA, and responses from the AVA to secondary storage. In addition, the DEFI can execute below the file system level. In such cases, the file system may be agnostic to disk event specific interactions between the DEFI and the AVA. That is, the operation of the file system may not depend upon the exchange of disk events between the DEFI and the AVA. And with the exception of error conditions, the normal operation of the file-system may be unaffected by disk eventing interactions.

The AVA is software, such as, for example, kernel mode software or software that is otherwise protected by suitable security measures, e.g., the storage controllers described above. Like the DEFI, the AVA may be executed by a processor, such as, for example, the processor of a host system.

The AVA can receive and analyze disk events that are generated from a secondary storage medium (e.g., a magnetic recording medium or solid state disk (SSD)), and determine whether to permit or deny write operations associated with such disk events. In some instances, the AVA may use system context information such as, for example, the process issuing the I/O and/or the destination address of the write operation to determine whether to affirm or deny a write operation under consideration. In addition, it may consider the contents or data (i.e. payload) of the write operation for known malware signatures before the data is committed to disk. Of course, other methods of analyzing write operations and determining whether to affirm or deny such operations are contemplated herein.

Once the AVA determines whether to affirm or deny a write operation, it can instruct the storage controller (e.g., through the disk eventing mechanism described below) to allow or deny the write operation. For example, the AVA may provide a positive (affirm) instruction, thereby permitting the write operation and committing its payload data to disk. Alternatively, the AVA may provide a negative (deny) write instruction, in which case the write operation will be denied and payload data will not be committed to disk. In some embodiments, the AVA instructs the storage controller via an appropriate control signal/instruction. Such control signal/instruction may be routed through the DEFI.

In some embodiments, communications between the AVA and the storage controller can occur through a secure channel, or tunnel. The secure channel can aid in the prevention of certain types of malware attacks, such as, for example, the so called "denial of service," and "spoofing" attacks. The ability of the secure channel to perform these functions is describe in detail below in connection with the description of the run time storage protections provided by the systems of the present disclosure. In some embodiments, the tunnel is established during system boot. For example, the AVA may load during the boot sequence of a system, and check whether disk eventing has been enabled on the secondary storage. If so, the AVA may follow a protocol with the storage controller (e.g., with the firmware of the storage controller) to establish a secure communications tunnel between the secondary storage medium and the AVA.

The present disclosure contemplates the use of a wide variety of AVAs. In some embodiments, an AVA that includes one or more built-in self-defense mechanisms (which are included in many commercial AVAs) to ensure its run-time integrity. Of course, other mechanisms for maintaining AVA run-time integrity may be used, and are contemplated by the present disclosure.

Disk eventing firmware is firmware that executes on a processor, such as, for example, to the host processor of a system, the processor of a storage controller, or another processor. In some non-limiting embodiments, the disk eventing firmware is executed in the environment of a storage controller. In addition to the aforementioned components, the storage controller may include its own local memory and processor (i.e., a storage controller processor). Disk eventing firmware may be resident on the local memory of the storage controller, and may be executed by the storage controller processor. In this environment, the local memory and storage controller may be isolated and thus, the disk eventing firmware may inaccessible to host software and may be immune from attack by malware. In some embodiments, the secondary storage medium is an SSD, and the disk eventing firmware may be executed on the storage controller of the SSD, e.g., on the SSD storage controller processor.

For the purpose of clarity, it should be noted that disk eventing firmware may be independent from other disk firmware (e.g., controller firmware), or integrated into such firmware. In some non-limiting embodiments, the disk eventing firmware is independent from other disk firmware, and may be stored in its own independent local memory within the storage controller of a secondary storage medium.

As described generally above, the systems of the present disclosure can monitor disk events generated by a storage controller (prompted, e.g., by disk eventing firmware executed by a storage controller processor) when write requests target sensitive areas of secondary storage. While the present disclosure envisions instances in which disk eventing mechanisms are installed and operational without additional action by a user, it may be the case that such features are not installed in conventional storage medium controllers, or are not operational in the default state of such controllers. Accordingly, one non-limiting mechanism of installing and/or enabling disk eventing firmware is described below.

Disk eventing firmware may be enabled and/or installed, for example, when an anti-virus solution is installed. In an ideal case, disk eventing firmware is enabled/installed shortly after the installation of an operating system. However, other enabling/installation times are contemplated as well.

In some instances, SSD's and other recording media include disk eventing capabilities in firmware. However, such capability is frequently deactivated in the disk/firmware, because disk eventing can be exploited by malware. Enabling the disk eventing capabilities of a secondary storage medium such as, for example, a solid state disk may therefore require explicit user authorization via a BIOS pre-boot authentication (PBA) setup program. The PBA may be shipped with the secondary storage medium, and may be displayed each time a system boots. Once disk eventing is enabled in the disk firmware, host software will be able to access the disk eventing capability by issuing disk eventing specific commands to the SSD.

During setup, a setup program for the AVA may be configured to identify a list of on-disk resources that are to be monitored by the disk eventing firmware. Such resources may include, for example, data or program (code) files, disk structures such as, for example, master file table entries or the master boot record, combinations thereof, and other resources. Once identified, the setup program of the AVA can obtain the location of these resources on the disk in terms of the logical block addresses (LBAs) that they occupy. The AVA can then send the LBA information to the disk firmware, e.g., via disk eventing specific commands. The LBA information can be used to program the disk eventing firmware, after which the disk eventing firmware can begin to generate events to the AVA when an attempt is made to write to any of the identified LBA ranges. In addition, the setup program may install a disk eventing event handler.

The operation of the systems described herein will now be described in detail with reference to FIGS. 7 and 8.

Figure 7:
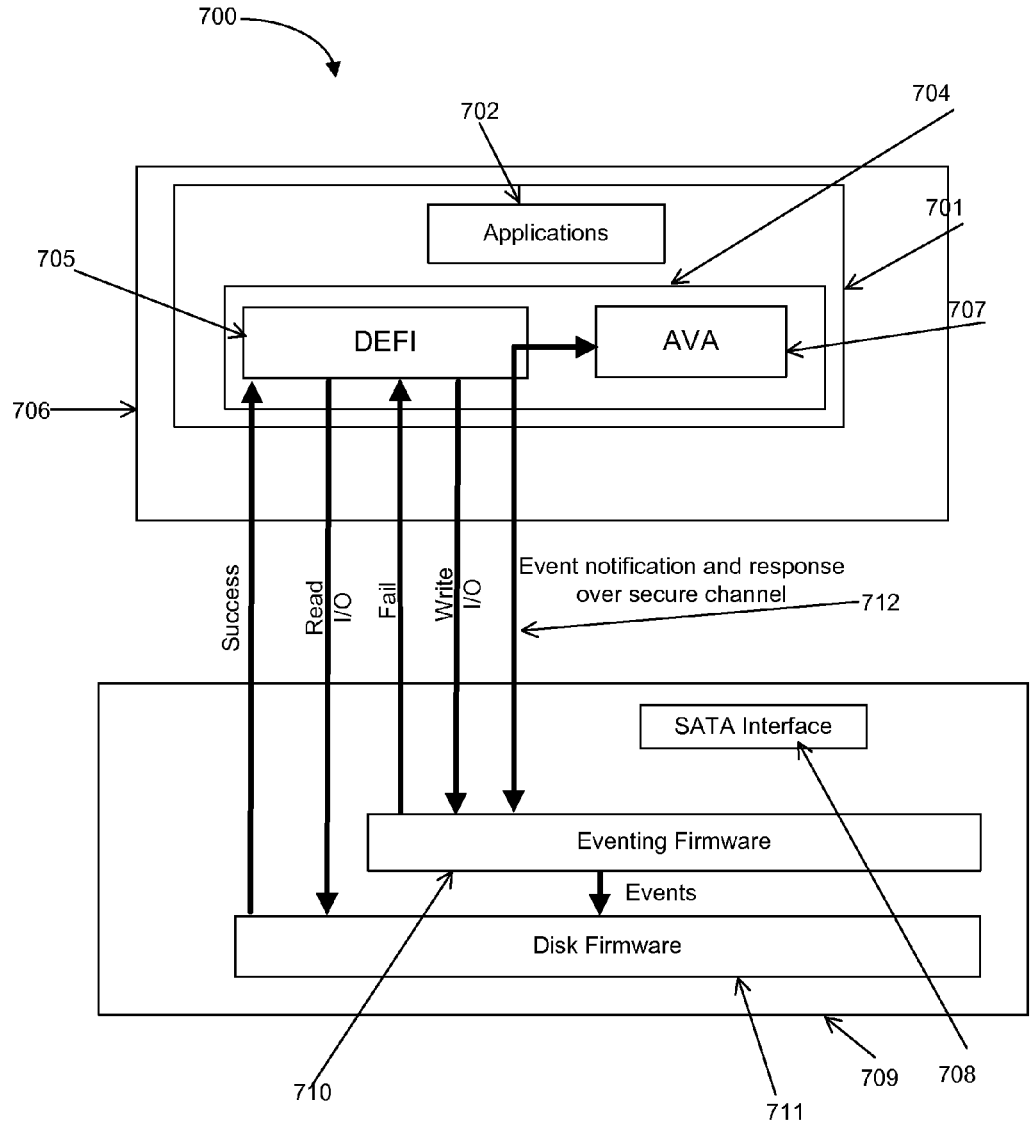
FIG. 7 illustrates a system configured in accordance with a non-limiting embodiment of the present disclosure.
Figure 8:
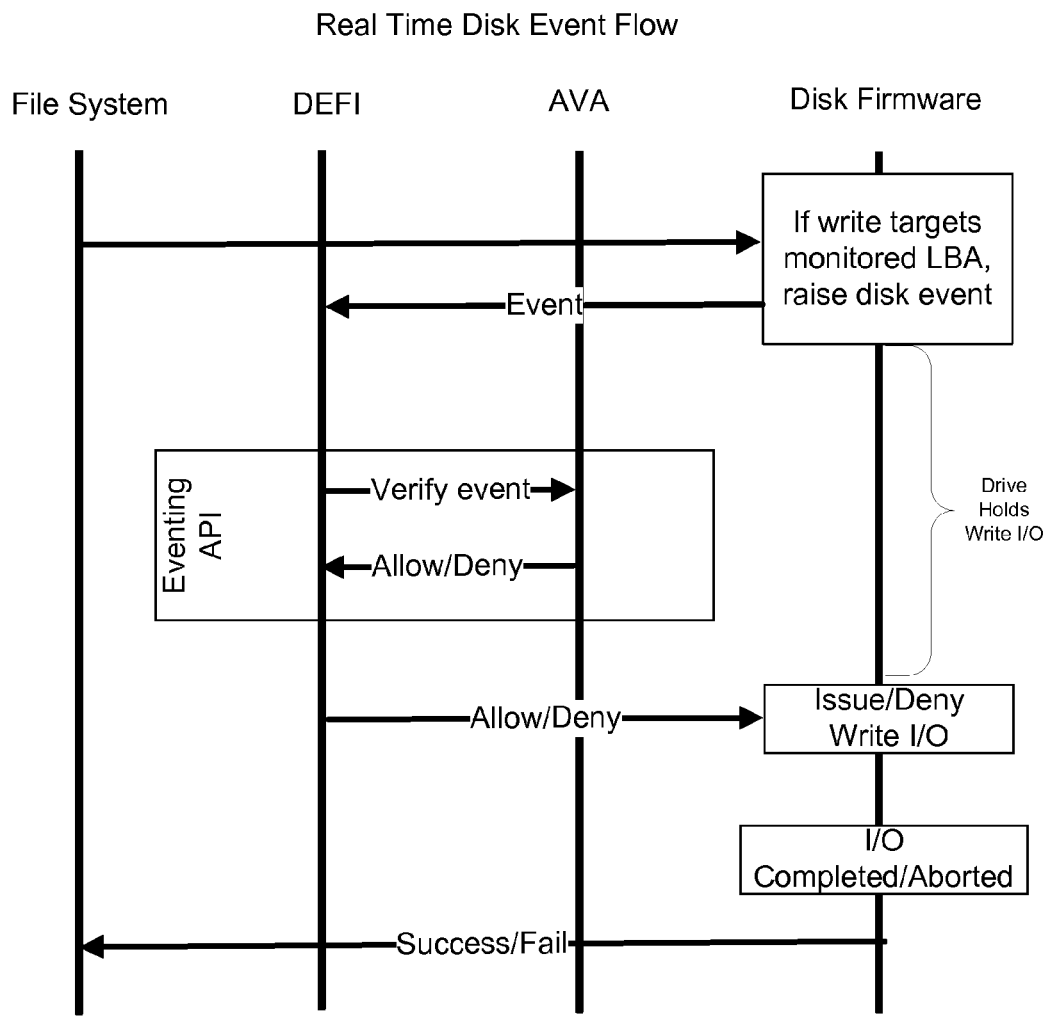
FIG. 8 illustrates a real time disk event flow in accordance with a non-limiting embodiment of the present disclosure.

FIG. 7 illustrates a system 700 configured in accordance with a non-limiting embodiment of the present disclosure. System 700 includes a processor 706 running software 701, such as, for example, applications 702 and OS 704. DEFI 705 is executed within the storage stack of OS 704, and AVA 707 is executed with the kernel of OS 704, which is in communication with secondary storage medium 709. Software 701 uses a hardware interface to communicate with hardware, such as, for example, SATA interface 708 of secondary storage medium 709.

Secondary storage medium 709 may include a memory (not shown) containing instructions stored thereon, e.g., disk eventing firmware 710 and disk firmware 711. As noted above, disk eventing firmware 710 may be stored and executed in the context of a storage controller (not shown) within secondary storage medium 709. For example, disk eventing firmware 710 may be executed by a storage controller processor (not shown). Of course, such firmware may also be contained in the main memory (RAM) of the host system.

The systems and methods of the present disclosure can provide run-time storage protection for information stored on secondary storage medium 709. With reference to FIG. 8, once disk eventing has been installed/enabled on secondary storage medium 709 and an AVA is in place, the storage controller (e.g., through disk eventing firmware 710) can monitor all write I/O request requests to secondary storage medium 709. If a write I/O request is found to target an LBA range that is monitored by the storage controller (e.g., disk eventing firmware 710), a disk event can be output from secondary storage medium 709 to the DEFI and AVA (which may be host based).

The AVA can analyze the disk event and the associated write I/O request, and make a determination as to whether to allow or deny the write I/O, as discussed above. Until the AVA completes its analysis and provides a response to the storage controller (e.g., disk firmware), the storage controller (e.g., through its disk firmware) can hold the write I/O request. That is, until the AVA affirms (permits) the write I/O request, the data that is the subject of the write I/O request will not be committed to secondary storage medium 709. If the AVA permits the write I/O request, the write I/O request will be allowed to proceed, and its data will be committed to secondary storage medium 709. If the AVA denies the write IP, the storage controller will return a failure to the host for the denied write I/O request, without committing the data to the secondary storage medium 709. In the latter case, the contents of the LBA that were targeted by the write I/O request remain unchanged. In the former case, the storage controller (or firmware executed thereby) can provide a positive response to the DEFI and AVA components. In this way, the AVA may protect on-disk resources from tampering by host software or malware at run-time.

Since the AVA is a software component, it is possible that malware could prevent disk eventing firmware generated disk events from reaching the AVA (e.g., through a so-called denial of service attack), or masquerade as an AVA decision making engine and return false information to the secondary storage medium (e.g., through a so called spoofing, or man-in-the-middle attack). For example, malware could always respond with an "allow" response to the disk firmware of a secondary storage medium, thereby turning off the disk eventing protections described herein.

To address the possibility of a denial of service attack, the systems and methods of the present disclosure may implement a "default deny" policy within the firmware of a secondary storage medium. Under such a scheme, if the AVA fails to respond to an event generated by the storage controller and/or the firmware of the secondary storage medium within a pre-specified timeout period, the write I/O request may be automatically denied. The pre-specified timeout period may, for example, be provisioned when a storage controller is provisioned. In this way, data on the secondary storage medium will be protected (i.e., write will be prevented) if malware prevents events generated by the firmware of the secondary storage medium from reaching the ABA and/or prevents responses generated by the AVA from reaching such firmware.

To account for the possibility of man-in-the-middle attacks, the systems and methods may employ a secure channel (or tunnel) between the AVA and the storage controller. In some non-limiting embodiments, such a secure channel (or tunnel) is established between the AVA, the DEFI, and the firmware of a secondary storage medium. This concept is illustrated in FIG. 7, wherein secure channel 712 enables communication between AVA 707, DEFI 705, and disk eventing firmware 710. The secure tunnel may be established when the AVA is started as a part of the system boot sequence. During such a sequence, the AVA and the storage controller (DEFI) may exchange a shared secret with one another, such as, for example, a key, a hashing sequence, or another identifier. In some embodiments, the AVA and storage controller (DEFI) keep this shared secret confidential, such that no other component in the system has access to it. The disk eventing firmware of the secondary storage medium may sign disk events that it sends to the AVA, and the AVA may use the shared secret to sign its responses.

Upon receiving a message, each component verifies the signature using the shared secret, and messages that fail the signature verification process are ignored. As a result, malware and third party components may not be able send messages to either the AVA or the disk eventing firmware, since they do not have access to the shared secret. This can effectively address or eliminate potential man-in-the middle attacks on the AVA, the storage controller, the DEFI, and the disk eventing firmware.

The disk eventing mechanism of the present disclosure may also be used to detect malware that conceals itself behind paging or swap files. However, because it may not be feasible to completely deny all write requests to paging or swap files, a more relaxed approach may be taken. For example, the disk eventing firmware may be configured such that it monitors write operations to paging or swap files. In such cases, this monitoring may be asynchronous with the commission of the content of a write operation to disk. That is, the secondary storage medium can notify the AVA via disk events of write operations to paging and swap files that are stored at monitored LBA addresses, while still allowing the commission of data corresponding to such write requests to disk. Post commission of the data, the AVA may scan the affected LBA addresses based on the disk events received from the disk eventing firmware, and apply malware remediation techniques as needed.

Another aspect of the present disclosure relates to machine-readable media containing instructions for performing the operations of the present disclosure, or containing design data which defines structures, circuits, apparatus, processors, and/or system features described herein. For example, the present disclosure contemplates articles comprising a machine readable medium having filter instructions stored thereon, which when executed by a processor cause the processor to execute operations consistent with the present disclosure. In other embodiments, the present disclosure contemplates machine readable media having at least one of AVA, DEFI, and disk eventing firmware instructions stored thereon, which when executed by a processor cause the processor to execute operations consistent with the present disclosure.

Other embodiments of the present disclosure will be apparent to those skilled in the art from consideration of the specification and practice of the inventions disclosed herein. It is intended that the specification be considered as exemplary only, with a true scope and spirit of the invention being indicated by the following claims.

What is claimed is:

1. A system, comprising
a hardware processor that, in operation, executes an operating system and at least one application;
an antivirus agent (AVA) comprising AVA instructions for execution by said hardware processor;
a secondary storage medium comprising:
   a protected region including a plurality of logical block addresses (LBA) storing protected data and protecting said protected data with a read only policy that prevents all write operations to said plurality of LBA by applications executing during runtime of said system until said system is rebooted; and
   an unprotected region to store an unprotected corresponding copy of said protected data;
a storage controller configured to output at least one disk event to said AVA when a write operation targets at least one of said LBA; and
in response to said at least one disk event said AVA instructions when executed cause the hardware processor to redirect and apply said write operation to said corresponding copy stored on said unprotected region, thereby producing a modified corresponding copy that includes a digital signature;

the system further comprising a patch verification agent comprising patch verification instructions which when executed by said hardware processor cause said hardware processor to:
- perform a validation operation that includes verifying the authenticity of said digital signature on said modified corresponding copy during a boot time of said system;
- when said validation operation succeeds, commit said write operation to said protected data during said boot time; and
- when said validation operation fails, deny said write operation.

2. The system of claim 1, further comprising a memory having disk eventing filter instructions (DEFI) stored thereon, wherein said DEFI when executed by said hardware processor causes said hardware processor to redirect said at least one disk event to said AVA, and to redirect replies from said AVA to said storage controller.

3. The system of claim 1, further comprising a secure channel between said AVA and said storage controller, wherein said storage controller outputs said at least one disk event output to said AVA via said secure channel, and said AVA outputs a response to said storage controller affirming or denying said write request via said secure channel.

4. The system of claim 1, wherein said secondary storage medium is a solid state disk.

5. A computer implemented method, comprising:
- monitoring write operations with a storage controller of a computer system, at least one of said write operations targeting at least protected data stored in at least one logical block address (LBA) of a protected region of a secondary storage medium, the at least one LBA protected by a read only policy that prevents all write operations to said at least one LBA by applications executing during runtime of said computer system until a subsequent boot time sequence of said computer system;
- in response to said write operations targeting said protected data, output a disk event from said storage controller to an antivirus agent (AVA) executed on a hardware processor;
- in response to said disk event, redirecting said write operations targeting said protected data to a corresponding copy of said protected data stored on an unprotected region of said secondary storage medium so as to produce a modified corresponding copy that includes a digital signature;
- performing a validation operation that includes verifying the authenticity of said digital signature on the modified corresponding copy during said subsequent boot time sequence of said computer system;
- committing said write operations to said protected data when said validation operation succeeds during said subsequent boot time sequence of said computer system; and
- denying said write operations when said validation operation fails.

6. The method of claim 5, further comprising routing a control signal and said disk event between said secondary storage medium and said AVA.

7. The method of claim 6, further comprising executing disk eventing filter instructions on said hardware processor at least in part to perform said routing.

8. The method of claim 5, further comprising:
- establishing a secure channel between said AVA and said storage controller;
- wherein outputting said disk events from said storage controller to said AVA occurs at least in part via said secure channel; and
- the method further comprises outputting a response affirming or denying at least one of said write operations from said AVA to said storage controller at least in part via said secure channel.

9. The method of claim 5, wherein performing said verification operation comprises executing a patching utility during said boot time.

10. At least one non-transient computer readable storage medium having disk eventing filter instructions (DEFI) and antivirus agent (AVA) instructions stored thereon which when executed by a hardware processor of a computer system result in the following operations comprising:
- with a storage controller, intercepting and inspecting write operations targeting at least one logical block address (LBA) of a secondary storage medium protected by a read only policy that prevents all write operations to said at least one LBA by applications executing during runtime of said computer system until a subsequent boot time sequence of said computer system;
- in response to a write operation targeting protected data stored in at least one LBA in a protected region of said secondary storage medium, outputting a disk event from said storage controller to an antivirus agent comprising said AVA instructions;
- in response to said disk event, redirecting said write operation targeting said protected data to a corresponding copy of said protected data stored on an unprotected region of said secondary storage medium so as to produce a modified corresponding copy that includes a digital signature;
- performing a validation operation that includes verifying the authenticity of said digital signature on the modified corresponding copy during said subsequent boot time sequence of said computer system;
- committing said write operation to said protected data when said validation operation succeeds during said subsequent boot time sequence of said computer system; and
- denying said write operation when said validation operation fails.

11. The at least one non-transient computer readable medium of claim 10, wherein said DEFI instructions when executed by said hardware processor further result in the following operations:
- routing said disk events from said disk controller to said AVA, and responses from said AVA to said secondary storage medium.

12. The at least one non-transient computer readable medium of claim 10, wherein performing said verification operation comprises executing a patching utility during said boot time.

13. The at least one non-transient computer readable medium of claim 10, wherein said DEFI and AVA instructions when executed by said hardware processor result in the following additional operations comprising:
- outputting said disk event at least in part via a secure channel between said storage controller and said AVA; and
- outputting a response affirming or denying said write operation from said AVA to said storage controller at least in part via said secure channel.

* * * * *